United States Patent [19]

Miller, Jr.

[11] Patent Number: 5,648,042

[45] Date of Patent: Jul. 15, 1997

[54] HIGH-TEMPERATURE BELT FURNACE APPARATUS AND METHOD OF USING SAME

[75] Inventor: Charles W. Miller, Jr., Williamsville, N.Y.

[73] Assignee: Centorr/Vacuum Industries, Inc, Nashua, N.H.

[21] Appl. No.: 541,711

[22] Filed: Oct. 10, 1995

[51] Int. Cl.$^6$ ........................................ F27D 3/00
[52] U.S. Cl. ..................... 266/44; 266/249; 266/252; 432/239
[58] Field of Search ................... 266/249, 252, 266/255, 44; 264/65; 432/78, 239, 243, 143

[56] References Cited

U.S. PATENT DOCUMENTS

| | | | |
|---|---|---|---|
| 3,762,014 | 10/1973 | Klein | 29/203 |
| 4,113,240 | 9/1978 | Klein | 266/252 |
| 4,797,238 | 1/1989 | Rhodes et al. | 264/65 |
| 5,242,156 | 9/1993 | Kay | 266/252 |
| 5,391,339 | 2/1995 | Wei et al. | 264/65 |
| 5,421,723 | 6/1995 | Katz et al. | 432/78 |

OTHER PUBLICATIONS

Dale E. Wittmer et al., "Continuous and Batch Sintering of Silicon Nitride" American Ceramic Society Bulletin, vol. 72, No. 6 (Jun. 1993) pp. 129–137.

Dale E. Wittmer et al., "Comparison of Continuous Sintering to Batch Sintering of $Si_3N_4$" Ceramic Bulletin, vol. 70, No. 9, Dec. 1991.

Primary Examiner—Scott Kastler
Attorney, Agent, or Firm—Lappin & Kusmer LLP

[57] ABSTRACT

High-temperature belt-type furnace apparatus utilizing a silicon carbide continuous belt design is disclosed.

30 Claims, 1 Drawing Sheet

HIGH-TEMPERATURE BELT FURNACE APPARATUS AND METHOD OF USING SAME

The present invention relates generally to improvements in a multizone, high-temperature, continuous belt-type furnace apparatus, more particularly to a silicon carbide belt design that facilitates efficient, continuous, high-temperature processing of relatively large and heavy articles under controlled atmosphere conditions.

BACKGROUND OF THE INVENTION

High-temperature materials processing has become increasingly important as a technique for manufacturing many types of special performance industrial components. Precision shapes comprising a large variety of metallic and non-metallic materials selected for certain desirable performance characteristics are commonly manufactured using a high-temperature environment. For example, powder metallurgy is a familiar process for making a wide range of components and shapes from a variety of metals and alloys initially in powder form. The process utilizes pressure and heat to form the powders into precision shapes that require minimal secondary finishing.

In another familiar industrial application, one or a mixture of ceramic oxides and other ceramic-like compositions can be sintered to form a composite product of desired shape. Although sintering occurs in loose powders, it is commonly enhanced by compacting the powder. In some applications, compacting is performed at room temperature, and the resulting compact is then sintered at elevated temperature without application of pressure. In other applications, a hot pressing process is used in which compacting is carried out at elevated temperature.

Typically, these and other types of high-temperature thermal processing operations are conducted in batch-style furnaces. A principal advantage of a batch-style furnace is that it has no moving internal parts. The inner walls of a batch-style furnace and any platform for supporting the product being processed can be readily fashioned from highly refractory materials which retain their structural stability even at the elevated processing temperatures of 1200° C. and above. Ceramic materials and graphite, for example, are commonly employed for such high-temperature applications. These materials, however, while highly refractory, are also typically quite brittle and generally are incapable of supporting heavy loads or retaining structural stability under significant tensile forces. Such material limitations have greatly restricted the use of these materials which, in turn, has limited innovation in high-temperature furnace design.

More particularly, it is well-recognized that conventional batch-type high-temperature furnaces are highly energy inefficient with relatively low throughputs and long processing times. These batch-type furnaces require long heating and cooling cycles of typically three-six hours each, even though actual processing time for many non-oxide ceramic materials at peak temperature is generally only about thirty-ninety minutes. During operation, substantial heat loss occurs as the entire furnace and its contents must repeatedly be brought up to temperature, held there for the requisite processing time, then gradually cooled, only to be reheated during the next processing operation. As a result, it has been costly and time-consuming to carry out such operations, as well as requiring a heavy capital investment in furnace equipment, which capital costs must be amortized over a relatively low product volume.

More recently, there has been interest in continuous processing operations as a way to overcome some of the drawbacks of the batch furnace. Thus, U.S. Pat. No. 3,762,014 (Klein) describes a process for fabricating anode preforms by continuously sintering deposits of tantalum to a very thin tantalum foil strip utilizing a drive apparatus which is adjacent to but completely external of the furnace. The Klein apparatus comprises a continuous belt driven by rotating drums to carry the foil strip and deposits into a furnace maintained at a temperature of 1800° C.–2500° C. The belt speed is adjusted so that a given section of the foil strip remains inside the furnace sufficiently long (e.g. 1–60 minutes) for the sintering to be completed. While inside the furnace, the foil strip is supported on a stationary, horizontally-disposed, refractory support member (reference numeral 40 in FIG. 4 of the Klein patent). The continuous belt (reference numeral 31 in FIG. 4 of the Klein patent) never enters the sintering furnace (reference numeral 37).

A different approach to continuous sintering utilizes a belt furnace design in which articles to be heated, such as discrete shaped containers holding metal or ceramic powder, are placed on a continuous conveyer belt to be carried into, through and out of a furnace preheated to appropriate temperature. In general, such a belt furnace design for sintering silicon nitride is described in an article by Dale E. Wittmer et al. entitled "Continuous and Batch Sintering of Silicon Nitride" appearing the *American Ceramic Society Bulletin*, vol. 72, no. 6 (June 1993) at pages 129–137, and in a second article by Dale E. Wittmer et al. entitled "Comparison of Continuous Sintering to Batch Sintering of $Si_3N_4$," appearing in *Ceramic Bulletin*, vol. 70, no. 9 (1991), both of which are incorporated herein by reference.

There are several reasons that sintering in belt furnaces is more cost effective than sintering in batch furnaces. The cycle time and thermal load remain substantially constant through the belt furnace, whereas the cycle time for batch furnaces increases with increasing thermal load. To reduce thermal lag in a batch furnace, the heating rate must be reduced to minimize thermal gradients across the load cross section. Larger thermal loads also take longer to cool in batch furnaces, whereas the cooling rate for belt furnaces depends on transport speed through the furnaces.

It is also well-known and accepted that the larger the batch furnace, the lower the expected furnace yield. The reduced yield is primarily due to the large thermal lag that exists between the parts and the furnace elements and the large temperature gradient that exists in the load during heating and cooling. To minimize temperature gradients, the heating and cooling rates need to be controlled, which adds to the sintering cycle time, and may have significant effects on the microstructure, surface reaction layers, and properties of the resulting sintered parts.

Furthermore, in belt furnaces, changes in operating conditions and onset of furnace failure are more easily detected and corrected than in batch furnaces. There is less product lost and less downtime to affect total production in the case of furnace upsets in belt furnaces compared with batch furnaces. When a problem is detected in a belt furnace, the furnace can be purged of the parts in the run, cooled, repaired, and brought back to operation in less than four to eight hours. Direct and indirect product losses can be kept to a minimum for the belt furnace.

Despite the seeming advantages, however, the use of continuous belt furnaces for high-temperature applications has been limited in practice. First, any components of a belt furnace which are permanently located in, or even temporarily pass through, the inside of the heated furnace must be highly refractory and able to withstand the extremely high operating temperatures of 1200° C. and above, often more than 2000° C., without melting, vaporizing, decomposing or losing structural stability. Although materials such as graphite and some ceramics are sufficiently refractory for such applications, they have also typically proven too brittle to be effectively formed into a moving belt capable of transporting objects into and through the heated furnace interior.

A tantalum ribbon belt, as shown for example in the Klein patent, can be formed with sufficient high-temperature ductility to survive a single furnace pass at low load capacity, as shown in Klein. But, the tantalum belt in the Klein patent was relatively narrow (about two inches wide), and no more than about a six-inch length of the belt was inside the heated furnace interior at any one time. Also, the very thin belt in the Klein patent only had to support relatively small, low-weight frozen slugs of metallic powder. Thus, it has been determined that the load capacity of the Klein tantalum belt was no more than about one-two ounces per square inch of belt surface, and the tensile rating was six pounds or less for a two-inch width of the belt. Furthermore, the tantalum belt in the Klein patent only needed to survive a single pass through the furnace and did not have to be sufficiently flexible to conform to the rounded outer surfaces of a pair of rotating drums, as is the case with a continuous belt drive. Because the heated tantalum belt oxidizes rapidly, becomes increasingly brittle, and distorts relatively easily, such a belt would be expected to fail relatively quickly in a high-temperature continuous belt application.

Another metal sometimes used for fabricating the belt of a high-temperature belt furnace is tungsten. Tungsten in pure form has relatively good high-temperature ductility and adequate strength for belt applications. But, at furnace operating temperatures, tungsten becomes highly reactive with carbon and oxygen, forming relatively brittle compounds. As a consequence of this limitation, tungsten belt furnaces must be kept free of atmospheric oxygen, and the tungsten belt must be cooled below reactive temperature before exiting the furnace. Inside the furnace, the atmosphere must also be kept free of carbon, which prevents the use of conventional, relatively inexpensive, and relatively thermally-efficient carbon interiors together with conventional fiber insulation, and also restricts the use of a carbon atmosphere inside the furnace. Instead, furnace interiors must be made of expensive tungsten construction to prevent contamination of the tungsten belt. Moreover, because tungsten is not a thermal insulator, conventional fiber insulation cannot be placed externally adjacent to the hot tungsten interior furnace wall. Instead, multiple tungsten shells are typically used to insulate such furnaces, which is expensive and thermally inefficient.

These and other problems with and limitations of the prior art are overcome with the improved high-temperature furnace apparatus of this invention.

OBJECTIVES OF THE INVENTION

Accordingly, a principal object of this invention is to provide an apparatus and process for efficient, continuous, high-temperature material processing.

It is a specific object of this invention to provide an improved, high-temperature, continuous-belt furnace apparatus for heat-treatment processing at temperatures of about 1200° C.–2100° C.

It is also an object of this invention to provide a multiple heating-zone furnace apparatus and a process for efficiently utilizing such a furnace.

Another object of this invention is to provide a continuous-belt furnace that utilizes conventional carbon interior components and a carbon atmosphere.

Specifically, it is an object of this invention to provide a high-temperature, belt-type furnace utilizing a silicon carbide continuous belt.

Other objects and advantages of the present invention will in part be obvious and will in part appear hereinafter. The invention accordingly comprises the apparatus and process, involving the various components and the several steps, and the relation and order of one or more of such components or steps with respect to each of the others, as exemplified in the following description and as illustrated by the drawing, or as would be apparent to those skilled in the art to which this invention pertains.

SUMMARY OF THE INVENTION

The improved, high-temperature furnace apparatus of this invention generally comprises an insulated furnace housing; one or, preferably, a plurality of separately controllable and monitored interior heating zones; a continuous link belt comprising silicon carbide links, said belt passing into, through, and out of the furnace interior; and a variable-speed drive mechanism for engaging and controlling the speed of the silicon carbide belt through the furnace. By adjusting the lengths and temperatures of the respective heating zones, the furnace inlet and outlet conditions, and the speed of the continuous belt, depending on the article or material being processed, process parameters can be optimized for thermal efficiency, speed and product performance requirements.

DETAILED DESCRIPTION OF PREFERRED EMBODIMENTS

Figure 1:
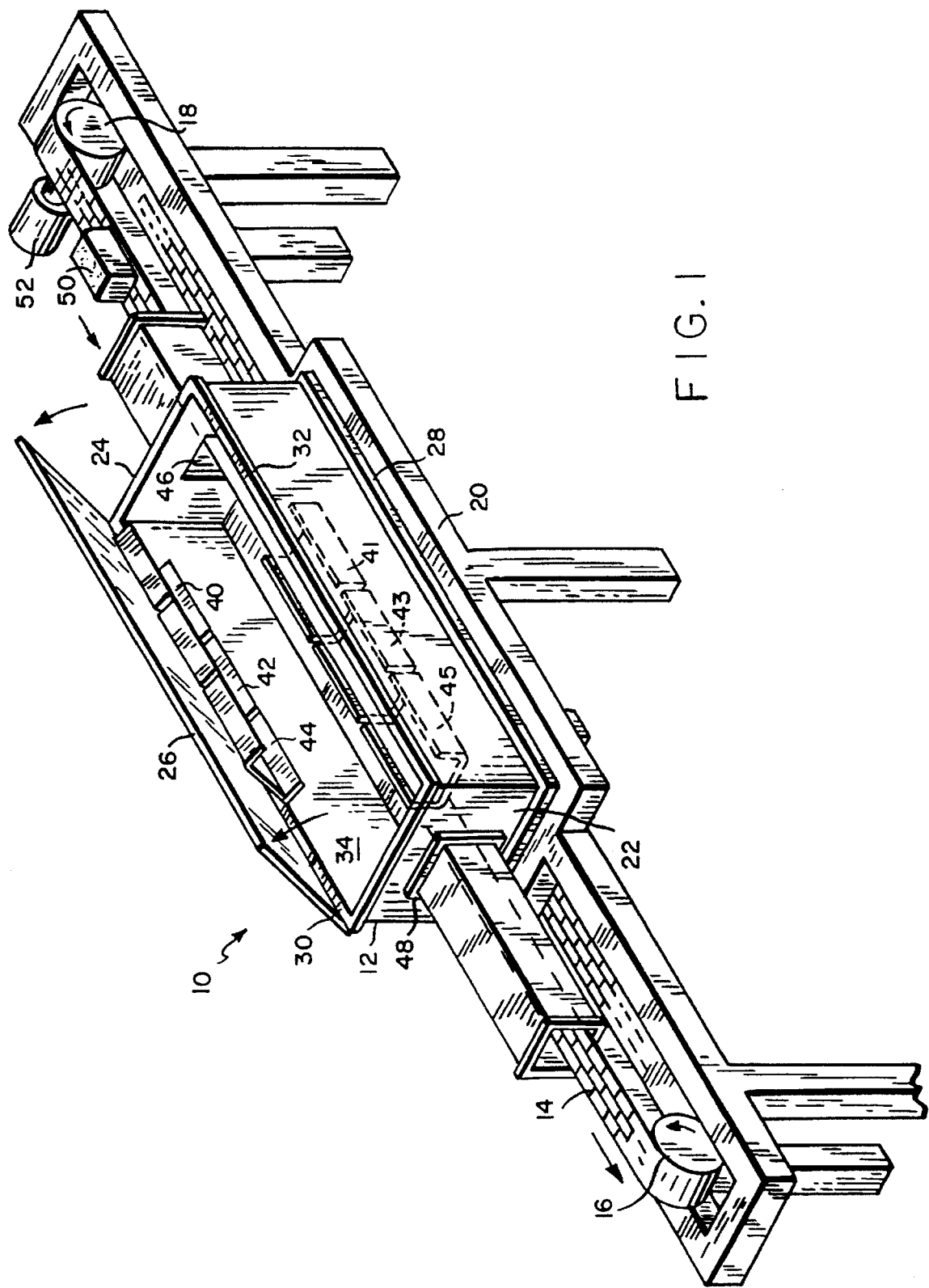
FIG. 1 is a schematic perspective view of a multi-zone, high-temperature belt-type furnace apparatus in accordance with this invention.

As seen in FIG. 1, a representative high-temperature furnace apparatus 10 in accordance with the present invention broadly comprises a furnace housing 12 and a continuous belt 14 passing through the interior of housing 12 and supported on opposite ends by rotatable drums 16 and 18, all in turn supported on a suitable platform or support structure 20. As shown in FIG. 1, furnace housing 12 comprises an elongated, box-like structure comprising end walls 22, 24, top and bottom walls 26, 28, and side walls 30, 32, enclosing and defining an elongated interior heating compartment or chamber 34. Top wall 26 may be hinged to side wall 30 to facilitate accessing the furnace interior 34 when the furnace is not in use. End wall 24 comprises an aperture or entry port 46; correspondingly, end wall 22 comprises an exit port 48. As seen in FIG. 1, belt 14 enters the furnace interior through port 46 and exits the furnace through port 48. Although the shape of the furnace housing and the interior compartment 34 are not critical elements of this invention, it will be understood that the generally rectangular, box-like construction as shown has certain advantages in ease of fabrication as well as from a thermal efficiency standpoint as compared with alternative configurations. Means may also be provided for continuously feeding a stream of an inert gas to the interior compartment 34 in order to maintain an inert atmosphere inside the furnace during operation.

The dimension of compartment 34 along its elongated axis will be selected in accordance with the desired lengths of the several heating zones inside the furnace which, in turn, may vary according to the intended heat-treating applications for which the apparatus will be used. Within limits, a furnace apparatus according to this invention may be adapted to a range of possible heat-treating applications by adjusting the temperatures of the heating zones and/or the speed of belt 14 through housing 12, but with possible thermal efficiency, speed, and material processing tradeoffs. Each heating zone inside the furnace should generally be at least as long as at least one external dimension of any article being heat-treated in the apparatus—i.e. larger articles may require larger furnaces and larger interior heating zones. Similarly, the width and top-to-bottom dimensions of the furnace interior may vary in accordance with the size of the articles being treated. Better thermal efficiency is achieved, and undesirable temperature gradients are minimized, however, by keeping the interior dimensions of compartment 34 commensurate with the dimensions of the articles being treated, in particular by minimizing the tolerances between the workload and the interior furnace walls.

In a preferred embodiment of this invention, at least the interior portions of housing walls 22, 24, 26, 28, 30 and 32 comprise carbon, such as graphite sheets. In addition, the housing walls may comprise fiber or other insulation directly adjacent to the carbon interior sections to further minimize heat loss. Because of the thermally-insulative properties of carbon, conventional insulation materials can be used to surround the interior carbon shell without risk of thermal deterioration. Because the belt material of this invention is not reactive with carbon, even at the elevated temperatures of the furnace interior, it is not necessary in the apparatus of this invention to utilize an expensive and thermally-conductive material like tungsten to line the interior of the furnace walls. Although carbon furnace interiors are generally preferred, certain heat treatment applications may require tungsten or other refractive materials for the furnace interiors of this invention. Thus, because a material such as aluminum nitride is reactive with carbon at high temperatures, furnaces in accordance with this invention intended for processing aluminum nitride components should avoid carbon interiors and carbon atmospheres. Instead, alternative interior construction and a different inert atmosphere would be utilized for such applications.

The furnace interior 34 as seen in FIG. 1 further comprises a plurality of independently monitored and regulated heating zones disposed sequentially along the elongated axis of housing 12 in line with the path of belt 14 through compartment 34. As shown in FIG. 1, three heating zones are established by means of three pairs of cooperating electric heating elements 40, 41; 42, 43; and 44, 45 positioned respectively along the interiors of top wall 26 and bottom wall 28 of housing 12. The electric resistance elements 40, 41; 42, 43; and 44, 45 preferably comprise graphite, tungsten, molybdenum or silicon carbide. (The electrical leads to elements 40, 41; 42, 43; and 44, 45 for regulating these elements and the leads for monitoring the temperatures in the three heating zones have been omitted from FIG. 1 for simplicity. Also omitted for simplicity are water cooling means for cooling the external portions of electric heating elements 40, 41, 42, 43, 44 and 45 while these elements are in use.)

Thus, a first article 50 to be heat-treated is placed on moving belt 14 to be transported into the interior 34 of the furnace through entry port 46. In one application of this invention, article 50 may comprise a refractory container or boat containing a ceramic powder held in a desired shape for sintering. Each article 50 may weight from about one-half pound to forty pounds or more, typically about 1–10 pounds. The speed of belt 14 is adjusted to ensure that the article is uniformly brought to temperature in each heating zone before passing into the next zone. After completion of the heat-treatment, belt 14 carries article 50 out of the furnace through exit port 48, where it is removed from belt 14. One of the important benefits of the continuous belt furnace apparatus of this invention is that additional articles to be heat-treated can be sequentially placed on belt 14 following article 50 for transport into the furnace interior without waiting for article 50 to be fully processed. Indeed, it has been found that a belt 14 that is four inches wide can support individual articles of about one to forty pounds weight, and a total load of one hundred pounds or more spaced along the top of belt 14 over a distance of about twelve feet separating drums 16 and 18. This facilitates a semi-batch operation in which a plurality of articles to be heat-treated are simultaneously passed through different heating zones of the furnace interior while being carried along belt 14. While one such article is being heat-treated at peak temperature, a second is in a transitional heating zone, while a third is in a transitional cooling zone. The result is greatly improved speed and thermal efficiency as compared with conventional batch operations.

In one embodiment of this invention utilizing the three-heating zone configuration shown in FIG. 1, the first heating zone (associated with elements 40, 41) is a transition zone maintained at a first temperature intermediate between ambient conditions and the desired heat-treating temperature. The second heating zone (associated with elements 42, 43) is maintained at a second temperature, which is the desired heat-treating temperature. The third heating zone (associated with elements 44, 45) is another transition zone maintained at a third temperature (which may or may not be the same as the first heating zone) intermediate between ambient conditions and the second temperature. Although FIG. 1 illustrates a three-zone furnace interior, it will be understood that fewer or larger numbers of heating zones may be utilized in accordance with this invention to accommodate particular processing needs. Thus, for example, a furnace interior in accordance with this invention might comprise four identically-sized heating zones with both of the middle two zones set for the desired peak processing temperature. At uniform belt speed, this configuration would result in an article 50 on belt 14 spending twice as long in the zone representing the peak processing temperature as in the two transition temperature zones. Other alternative heating zone configurations are also possible, and all such configurations considered within the scope of this invention.

The advantage of this furnace configuration in a high-temperature sintering operation is the ability to exercise control not merely at the desired heat-treating (second) temperature, but also over the rate and conditions under which the article 50 is heated to the desired heat-treatment temperature and the rate and condition under which the article is cooled following the treatment at peak temperature. These associated transitional heating and cooling operations have been found to greatly affect the crystal microstructure and, thus, the properties and performance characteristics of the final sintered article. A fine-grained microstructure resulting from gradual and uniform heating and cooling has been found to significantly increase product strength. One of the chief benefits of the apparatus and process of this invention is therefore the ability to fine-tune the various process parameters in order to optimize processing conditions for maximizing efficiency and product strength.

Belt 14 may comprise any highly-refractive material which has sufficient strength, flexibility and resilience at high temperatures of about 1200° C. or above to function as a continuous moving belt without significant stretching, distortion, or deterioration. In particular, the belt material should remain substantially impervious to oxidization or carbonization even at elevated temperatures to avoid brittilization and premature failure. Belt 14 must be strong enough to support relatively heavy loads of, for example, forty pounds per two-inch belt width, as well as the operating tensile forces of a belt drive system.

One commercially-available material which meets these demanding belt specifications is a sintered silicon carbide belt formed from an array of discrete interlocking "links." Such a belt is produced by Carborundum Corporation and is sold under the tradename "Hexalloy." The interlocking link or mesh structure of this type of belt imparts added flexibility needed for use in a continuous belt system in cooperation with rotating drums. Silicon carbide is a highly refractory material which remains stable up to temperatures as high as about 2600° C. These silicon carbide belts have been found to be capable of supporting large and relatively heavy loads, and also remain substantially inert to oxygen and carbon even at elevated temperatures. Other belts formed of other materials but still meeting the requirements of this invention may become commercially available in the future and, in such case, may be substituted for the silicon carbide belts described herein without departing from the scope of this invention.

In a preferred embodiment as shown in FIG. 1, continuous belt 14 is supported at opposite ends by rotatable drums 16 and 18, which releasably engage portions of belt 14 by frictional contact and rotate in the direction indicated by the arrows. Alternatively, at least one of drums 16, 18 may comprise a set of engagement "fingers" along its outer circumference adapted to releasably engage the interlocking linkages of belt 14. Any conventional, regulatable, variable-speed drive mechanism, such as stepping motor 52, may be connected to at least one of the rotatable drums, such as drum 18, and used to drive the belt in the direction indicated by the arrows. Alternative drive mechanisms for belt 14 are also considered within the scope of this invention. In still another preferred embodiment of the invention as illustrated in FIG. 1, inlet port 46 and outlet port 48 may be associated respectively with water-cooled inlet tunnel 54 and water-cooled outlet tunnel 56. Inlet tunnel 54 serves primarily to protect the furnace operator and others working nearby from the enormous amount of radiant heat which escapes from the furnace interior through inlet port 46 when the furnace is operating at temperatures of 2000° C. or so. Outlet tunnel 56 serves both to protect personnel from escaped heat but also to provide added cooling for the article exiting the furnace.

The continuous belt furnace apparatus and process of this invention reduce energy requirements in high-temperature processing because of furnace construction and insulation advantages as well as due to inherent processing efficiencies. Because of thermal efficiencies, less water flow is required for cooling the exterior portions of the electric heating elements of the furnace apparatus of this invention. The furnace apparatus and process of this invention make it possible to heat-treat articles that previously were too large or too heavy to be treated in any way other than a batch furnace. The higher throughput and faster processing times achievable with the apparatus and process of this invention significantly reduces the cost of industrial products fabricated by high-temperature heat treatment. The ability to carefully control internal furnace temperatures and heating and cooling rates for articles inside the furnace results in stronger, higher-quality sintered articles than have previously been possible.

It will be apparent to those skilled in the art that other changes and modifications may be made in the above-described apparatus and process without departing from the scope of the invention herein, and it is intended that all matter contained in the above description shall be interpreted in an illustrative and not in a limiting sense.

Having described the invention, what I claim is:

1. An apparatus for high-temperature material processing of articles weighing about one-half pound or more comprising in combination:
   (a) insulated housing means defining an interior compartment, said housing means further comprising inlet and outlet means;
   (b) at least a heating zone located in said interior compartment;
   (c) continuous belt means consisting essentially of interlocking links of sintered silicon carbide capable of supporting a load of about one-half pound or more without significant belt distortion at temperatures above about 1200° C., wherein said belt means enters said housing means through said inlet means, passes through said heating zone, and exits said housing means through said outlet means; and
   (d) variable-speed drive means for regulating the speed of said belt means.

2. Apparatus according to claim 1 wherein said heating zone comprises a plurality of heating means disposed sequentially along the path of said belt means through said interior compartment.

3. Apparatus according to claim 2 wherein each said heating means comprises at least an electric heating element.

4. Apparatus according to claim 2 further wherein each said heating means comprises means for temperature regulation and monitoring.

5. Apparatus according to claim 1 wherein said inlet and outlet means comprise inlet and outlet ports respectively in opposite walls of said housing means.

6. Apparatus according to claim 5 wherein said inlet and outlet means further comprise entry and exit enclosures associated respectively with said inlet and outlet ports.

7. Apparatus according to claim 1 wherein said variable-speed drive means comprises a pair of rotatable drums supporting opposite ends of said belt means, means for releasably engaging a portion of said belt means on said drums, and means for rotating at least one of said drums.

8. Apparatus according to claim 7 wherein said means for engaging is frictional contact.

9. In a high-temperature furnace apparatus designed to operate at peak temperatures of at least 1200° C., the improvement comprising an externally-driven continuous belt consisting essentially of interlocking links of sintered silicon carbide capable of supporting a load of about one-half pound or more without significant belt distortion, said belt passing through the interior of said furnace along a generally horizontal plane.

10. Apparatus according to claim 9 further wherein said interior of said furnace comprises multiple, independently-regulatable heating zones.

11. Apparatus according to claim 10 further comprising means for maintaining at least two of said heating zones at different temperatures.

12. Apparatus according to claim 10 wherein said heating zones comprise electric heating elements disposed in sequence along the path of said belt through said interior.

13. An apparatus for high-temperature material processing of articles weighing about one-half pound or more comprising in combination:

(a) insulated housing means defining an interior compartment having carbon sidewalls, said housing means further comprising inlet and outlet means;

(b) at least a heating zone located in said interior compartment;

(c) continuous belt means consisting essentially of interlocking links of sintered silicon carbide capable of supporting a load of about one-half pound or more without significant belt distortion at temperatures above about 1200° C., wherein said belt means enters said housing means through said inlet means, passes through said heating zone, and exits said housing means through said outlet means; and (d) variable-speed drive means for regulating the speed of said belt means.

14. Apparatus according to claim 13 wherein said heating zone comprises a plurality of heating means disposed sequentially along the path of said belt means through said interior compartment.

15. Apparatus according to claim 14 wherein each said heating means comprises at least an electric heating element.

16. Apparatus according to claim 14 further wherein each said heating means comprises means for temperature regulation and monitoring.

17. Apparatus according to claim 13 wherein said inlet and outlet means comprise inlet and outlet ports respectively in opposite walls of said housing means.

18. Apparatus according to claim 17 wherein said inlet and outlet means further comprise entry and exit enclosures associated respectively with said inlet and outlet ports.

19. Apparatus according to claim 13 wherein said variable-speed drive means comprises a pair of rotatable drums supporting opposite ends of said belt means, means for releasably engaging a portion of said belt means on said drums, and means for rotating at least one of said drums.

20. Apparatus according to claim 19 wherein said means for engaging is frictional contact.

21. A method of thermally treating an article having a weight of about one-half pound or more at temperatures above about 1200° C. comprising the steps of: placing said article on a portion of a moving, continuous conveyer belt consisting essentially of interlocking links of sintered silicon carbide; passing said article and said belt portion at a controlled speed through a sequence of at least two progressively hotter heating zones so as to heat said article and said belt portion to a temperature above about 1200° C. in the hottest of said heating zones; and, passing said article and said belt portion at a controlled speed through a sequence of one or more progressively cooler heating zones, each maintained at a temperature intermediate between that of said hottest heating zone and ambient conditions so as to cool said article.

22. Method according to claim 21 wherein said heating zones comprise the interior of a furnace.

23. Method according to claim 22 further wherein each of said heating zones comprises an electrical heating element.

24. Method according to claim 21 wherein said article comprises a container holding a ceramic powder.

25. Method according to claim 21 wherein a plurality of articles to be treated are carried simultaneously on said belt.

26. Method according to claim 25 wherein at least one of said articles is being held at said predetermined temperature while at least another of said articles is being heated to said predetermined temperature and while at least another of said articles is being cooled from said predetermined temperatures.

27. Method according to claim 26 wherein each of said articles weighs about one pound or more.

28. Method according to claim 27 further wherein the total weight of said articles on said belt ranges from about 10–100 pounds.

29. A method of thermally treating an article having a weight of about one-half pound or more at temperatures above about 1200° C. comprising the steps of: placing said article on a portion of a moving, continuous conveyer belt consisting essentially of interlocking links of sintered silicon carbide; passing said article and said belt portion at a controlled speed through a furnace interior defined by carbon walls, said furnace interior comprising a sequence of at least two progressively hotter heating zones so as to heat said article and said belt portion to a temperature above about 1200° C. in the hottest of said heating zones; and, passing said article and said belt portion at a controlled speed through a sequence of one or more progressively cooler heating zones, each maintained at a temperature intermediate between that of said hottest heating zone and ambient conditions so as to cool said article.

30. An apparatus according to claim 1 further wherein said belt means has a width of about four inches and is capable of supporting individual articles of about one to forty pounds weight, and a total load of one hundred pounds or more spaced along the top of the belt over a distance of about twelve feet.

* * * * *